United States Patent [19]

Revol et al.

[11] Patent Number: 5,629,055

[45] Date of Patent: May 13, 1997

[54] SOLIDIFIED LIQUID CRYSTALS OF CELLULOSE WITH OPTICALLY VARIABLE PROPERTIES

[75] Inventors: Jean-François Revol, Montreal; Donat L. Godbout, Outremont; Derek G. Gray, Montreal West, all of Canada

[73] Assignee: Pulp and Paper Research Institute of Canada, Pointe-Claire, Canada

[21] Appl. No.: 201,450

[22] Filed: Feb. 14, 1994

[51] Int. Cl.$^6$ .............................. C08L 1/00; C09K 19/00
[52] U.S. Cl. ........................ 428/1; 428/322.2; 428/326; 349/164; 349/105
[58] Field of Search .......................... 428/1, 322.2, 326; 252/299.01, 299.3, 299.7; 359/66, 101, 105

[56] References Cited

U.S. PATENT DOCUMENTS

| | | | |
|---|---|---|---|
| 4,614,619 | 9/1986 | Shannon | 552/544 |
| 4,637,896 | 1/1987 | Shannon | 252/299.7 |
| 4,840,673 | 6/1989 | Cuculo | 106/198 |
| 5,215,757 | 6/1993 | El-Nokaly | 424/488 |

FOREIGN PATENT DOCUMENTS

| | | |
|---|---|---|
| 1214592 | 11/1986 | Canada . |
| 1255653 | 6/1989 | Canada . |
| 2032587 | 6/1991 | Canada . |
| 0357850 | 3/1990 | European Pat. Off. . |
| 1349050 | 3/1974 | United Kingdom . |
| 1387389 | 3/1975 | United Kingdom . |
| 2166755 | 5/1986 | United Kingdom . |

OTHER PUBLICATIONS

Dobrowolski, J.A.; Ho, F.C. and Waldorf, A., Applied Optics, vol. 28, No. 14, (1989).

DeVries, H., Acta Crystallogr., 4, 219 (1951).

Fergason, J.L., Molecular Crystals, 1, 293 (1966).

Jacobs, D.C., "Liquid Crystals for Laser Applications", in Optical Materials Properties, CRC Handbook of Laser Science and Technology, vol. IV ed. Weber, M.J., pp. 409–465 (1986).

Hikmet, R.A.M. and Zwerver, B.H., Liquid Crystals, 13, No. 4, 561 (1993). Note to the Editor "Helicoidal self–ordering of cellulose microfibrils in Aqueous Suspension", Revel et al, 170 Int. J. Biol. Macromol., 1992, vol. 14, Jun.

Chiral Nematic Suspensions of Cellulose Crystallites; Phase Separation and Magnetic Field Orientation, Revol et al.

Julie Giasson et al "Electron Microscopic Evidence for Cholesteric Structure in Films of Cellulose and Cellulose Acetate, Biopolymers", vol. 27, 1999–2004 (1988).

Charlet et al, "Solid Cholesteric Filsm Cast from Aqueous (Hydroxypropyl) cellulose", American Chemical Society, Macromolecules 1987, 20, 33–38.

Liquid Crystalline Structure in Aqueous hydroxpropyl Cellulose Solutions, Werbowyj et al, Mol.Cryst.Liq.Cryst., Col.34 (Letters) pp–97–103.

(List continued on next page.)

*Primary Examiner*—Nasser Ahmad
*Attorney, Agent, or Firm*—Swabey Ogilvy Renault

[57] ABSTRACT

Solid films with novel optical properties are produced from colloidal suspensions of cellulose crystallites; the colloidal suspensions are prepared by acid hydrolysis of crystalline cellulose under carefully controlled conditions; the solid materials possess a helicoidal arrangement of the constituent crystallites; by appropriate selection of conditions for preparation and treatment of the colloidal suspensions, solid films are produced that reflect circularly polarized visible light; the wavelength of the reflected light can be controlled to give colours across the visible spectrum from red to violet, and if necessary to infrared and ultraviolet wavelengths. The reflected iridescent colours arise from optical interference effects, and change with the viewing angle; this makes the materials ideally suited for optical authenticating devices, since no printing or photocopying technique can reproduce this effect; furthermore, they are easily distinguishable from other optical interference devices since they have additional optical properties.

35 Claims, 1 Drawing Sheet

OTHER PUBLICATIONS

"Optical Rotatory Power of Liquid Crystals", Chandrasekhar et al, Acta. Cryst. (1968)A24,445.

"Twisted Architectures in Cell–Free Assembled Collagen Gels:Study of Collagen Substrates Used for Cultures", Bouligand et al Biol.Cell. 54, 143–162(1985).

"In vitro Chiral Nematic Ordering of Chitin Crystallites", Revol et al IJBM1593.MCP.

Color Gamut of Liquid Crystal Polysiloxanes, D. Makow, Mol.Cryst.Liqu.Cryst., 1985, vol. 123, pp. 347–353.

Scarabaeid Beetle Exocutical as an Optical Analogue of Cholesteric Liquid Crystals, Neville et al Biol.Rev. (1969), 44 pp. 531–562.

Chiroptical Filters from Aqueous (Hydroxypropyl) cellulose Liquid Crystals, Charlet et al, Journal of Applied Polymer Science, vol.37,2517–2527 (1989).

"The Cholesteric Phase in Polypeptide Solutions and Biological Structures" Robinson, Mol.Crys., 1966,vol. 1, pp. 467–494

Chem.Ab. 112:79036d,vol.112,1990,p.79.
Chem.Ab. 105:154823u,vol.105,1986,p.95.
Chem.Ab. 111:218368h,vol.111,1989,p.250.
Chem.Ab. 106:111459h,vol.106,1987,p.74.
Chem.Ab. 101:181722j,vol.101,1984,p.671.
Chem.Ab. 106:165853a,vol.106,1987,p.628.
Chem.Ab. 112:120237k,vol.112,1990,p.61.
Chem.Ab. 114:92031j,vol. 114,1991,p.705.
Chem.Ab. 113:68894b,vol.113,1990,p.656.

U.S. Nat. Tech. Inform. Serv., AD Rep., No. 74986, 10 pp. From: Gov. Rep. Announce (U.S.) 1972, 12(17), 54, "Solid State Morphology of Some Polypeptide Films", Friedman et al.

SOLIDIFIED LIQUID CRYSTALS OF CELLULOSE WITH OPTICALLY VARIABLE PROPERTIES

BACKGROUND OF THE INVENTION i) Field of the Invention

The present invention relates to new man-made materials that reflect circular polarized visible light; more especially the invention relates to a solidified liquid crystal cellulose film; an article comprising the film supported on or embedded in a planar substrate; a process for producing the film and a novel dispersion.

ii) Description of Prior Art

Chiral nematic (cholesteric) liquid-crystalline phases are characterized by a unique helicoidal molecular orientation.

Chiral nematic phases are known to have particular and unique optical properties when the pitch is of the same order of magnitude as the wavelength of visible light.

Three major properties can be distinguished, as follows:
a) Reflection of light by constructive interference;
b) Circular polarization of the reflected light and reflection of circular polarized light of the same handedness as the chiral nematic structure without change of handedness;
c) Exceptional optical activity (rotation of transmitted plane-polarized light).

The first of these is not limited to materials with chiral nematic order. It is due to a periodic layered structure, and is also found in smectic liquid crystals, in optical security devices made of thin alternating layers of metals and ceramics as well as in multilayer film coextrusions, (Dobrowolski, J. A.; Ho, F. C. and Waldorf, A., Applied Optics, Vol. 28, No. 14, (1989)). When white light is directed onto such materials, only characteristic wavelengths are reflected and these vary with the viewing angle. These reflections are due to constructive interference which follows Bragg's law. The light that is transmitted will lack the reflected wavelengths and hence will show the complementary spectrum. Only if the periodic repeat distance or chiral nematic pitch is of the order of visible light divided by the mean refracture index of the material, will iridescent colours that change with the viewing angle be seen; beyond these limits the phenomenon must be detected with infrared or ultraviolet sensitive equipment, but it is still present.

This optical variation is impossible to reproduce by any printing or photocopying process. For this reason, multilayered ceramic materials based on this principle have been manufactured and used as security devices to prevent counterfeiting of bank notes as described by Dobrowolski referred to hereinbefore. However, these ceramic materials are costly to manufacture, do not adhere easily to paper products and when added to paper prevent recycling of the broke since they do not redisperse. They are nevertheless thought to be more attractive than liquid crystal based devices for this use, for reasons mentioned below.

The second and third optical properties of chiral nematic liquid crystals concern circular polarization and optical activity, De Vries, H., Acta Crystallogr., 4, 219 (1951), and Fergason, J. L., Molecular Crystals, 1, 293 (1966). Useful applications of these properties have been proposed in liquid crystal optics for laser systems, (Jacobs, S. D., "Liquid Crystals for Laser Applications", in *Optical Materials Properties, CRC Handbook of Laser Science and Technology*, Vol. IV, ed. Weber, M. J., pp 409–465 (1986)), and as optical storage devices, (Hikmet, R. A. M. and Zwerver, B. H., Liquid Crystals, 13, No. 4, 561 (1993)).

Chiral nematic liquid crystals with these properties have also been considered as optical security devices in the past, but they suffer from the obvious problem that, by definition, liquid crystals are fluid, so that some way has to be found to incorporate them in solids while maintaining the characteristic order of the fluid state. The materials have been encapsulated, as described in British Patent 1,387,389, dispersed in solids, or sandwiched between glass or polymer films, but their colours change with the temperature; this change of colour with temperature makes the materials useful as thermal sensors. Solids or gels in which the liquid-crystalline order is preserved may be prepared by photopolymerization, crosslinking or cooling polymeric chiral nematics below their glass transition temperatures and will show relatively stable colours as long as they are not heated above it. Some chiral nematic liquid-crystalline polypeptide solutions also preserve their ordering when dried, but their pitches are not in the visible spectrum, (Friedman, Emil; Anderson, Courtney; Roe, Ryong-Joon and Tobolsky, Arthur V., U.S. Nat. Tech. Inform. Serv., AD Rep., No. 74986, 10 pp. Avail. NTIS, from: Gov. Rep. Announce. (U.S.), 1972, 12(17), 54). Proposed applications for solidified chiral nematic liquid crystals include security devices as in EP 435,029, decorative coatings as in BE 897,870; BE 897,871; U.S. Pat. No. 4,614,619; U.S. Pat. No. 4,637,896; BE 903,585 and DE 3,535,547, partially reflective films for car windows as in JP 01 61,238 and JP 01,207,328, or optical filters as in JP 61,170,704, in L.C.D.'s and information storage devices as in JP 01,222,220; JP 02,16,559 and EP 357,850.

Thus, many compositions and applications of chiral nematic liquid crystals are known. In all the above examples, the materials are composed of helicoidally oriented molecules or segments of molecules. Recently, aqueous suspensions of cellulose and chitin crystallites (fragments of microfibrils obtained by acid hydrolysis) were found to form chiral nematic liquid-crystalline phases by rapid and spontaneous self-assembly, (Revol, J.-F.; Bradford, H.; Giasson, J.; Marchessault, R. H. and Gray, D. G., Int. J. Biol. Macromol., 14, 170 (1992)), and to align with the chiral nematic axis parallel to strong magnetic fields, (Revol, J.-F.; Godbout, L.; Dong, X. M.; Gray, D. C.; Chanzy, H. and Maret, G., Liquid Crystals, in press). These phases are quite distinct from the molecular chiral nematics described above, in that the elements in the helicoidal arrangement were of colloidal dimensions, at least an order of magnitude larger than the molecules in most previously known chiral nematic suspensions. They are also distinct from previously known suspensions of cellulose crystallites (U.S. Pat. No. 2,978,446 and Marchessault, R. H.; Morehead, F. F. and Walter, N. M., Nature, 184, 632 (1959)), for which there is no evidence of their forming chiral nematic ordered phases.

Preliminary attempts to prepare solids from chiral nematic suspensions gave materials with chiral nematic pitch much greater than that necessary to reflect visible light (Revol et al, supra). Not surprisingly, no reflection colours were observed.

In fact, no prior procedure is known by which the final pitch obtained by drying such preparations can be controlled.

SUMMARY OF THE INVENTION

It is an object of this invention to provide a solidified liquid crystal film having advantageous optical characteristics.

It is a particular object of the invention to provide a solidified liquid crystal cellulose film having advantageous optical properties.

It is another object of this invention to provide an article comprising a film of the invention supported on a substrate.

It is another object of this invention to provide an article comprising a film of the invention embedded in a planar substrate.

It is still another object of this invention to provide a process for producing a film of the invention.

It is yet another object of this invention to provide a colloidal dispersion for use in producing the film of the invention.

In accordance with one aspect of the invention there is provided a solidified liquid crystal film comprising rod-like particles of colloidal dimensions in a helicoidal arrangement exhibiting a pitch of about 0.1 μm to 1 μm; said film reflecting left-circular or right-circular polarized light over a spectrum from ultraviolet to near-infrared.

In accordance with a particular aspect of the invention there is provided a solid liquid crystal cellulose film comprising cellulose crystallites in a helicoidal arrangement exhibiting a chiral nematic pitch of about 0.1 μm to 1 μm; said film reflecting left-circular polarized light over a spectrum from ultraviolet to near-infrared.

In accordance with a particular aspect of the invention there is provided an article comprising the film of the invention supported on a substrate.

In accordance with another aspect of the invention there is provided a process for producing a solid liquid crystal cellulose film comprising: hydrolyzing a particulate natural cellulosic material with acid, recovering a stable colloidal dispersion of cellulose crystallites in a concentration range from about 1% to 20% w/w, allowing said crystallites to form a chiral nematic liquid crystalline phase in said dispersion, casting said dispersion as a wet film on a planar support, and drying said wet film to provide said solid liquid crystal cellulose film on said support.

In accordance with still another aspect of the invention there is provided an aqueous dispersion comprising 1% to 20% w/w of colloidal particles of cellulose crystals which form a chiral nematic liquid crystal in an aqueous vehicle.

The films may be employed as optical authenticating devices or for decorative purposes. Thus a film of the invention may be cast on a substrate which carries data, for example, paper of value, an identity card or a credit card, to protect against attempted forgery using color copiers.

Thus the invention relates to films possessing a helicoidal arrangement of the constituent cellulose crystallites, such that the magnitude of their chiral nematic pitch is from 0.1 μm to 1 μm. The materials thus reflect circular polarized light over a spectrum spanning wavelengths from the ultraviolet to the near infrared, and thus include films having a coloured iridescent appearance. Their chiral nematic axis is preferentially perpendicular to the film surface, yielding a quasi-planar texture. The film material can be cast in a variety of sizes, colours or shapes and attached to a variety of substrates. The film material is readily produced from abundant native crystalline cellulose sources; solidified chiral nematic polymers with similar optical properties require complex synthetic chemistry.

The cellulose-based film material of the invention is more compatible with paper products than thin-layer optically variable devices made from ceramics, in addition to reflecting light with a characteristic polarization. These properties are not reproducible by printing or photocopying so that the film material is suitable for use in optical security devices. Other possibilities include use as decorative materials, optical filters or chiral selective membranes.

DETAILED DESCRIPTION OF THE INVENTION

The films of the invention may have incorporated therein additives which provide desired characteristics such as enhanced flexibility or strength, provided such additives do not interfere with or hinder the chiral nematic structure. Such additives include plasticizers, reinforcing agents and polymer resins. In the manufacture of the film such additives would be incorporated, in an appropriate amount having regard to the desired function, in the aqueous dispersion, before, during or after formation of the chiral nematic liquid crystalline phase in the dispersion.

A chiral nematic pitch of 0.1 μm to 1 μm in the helicoidal arrangement in the film results in the film reflecting left-circular polarized light over a spectrum from ultraviolet to near-infrared. In a preferred embodiment the chiral nematic pitch is about $0.4/n$ μm to $0.8/n$ μm, where n is the mean index of refraction of the material resulting in a film having a coloured iridescent appearance and reflecting left-circular polarized light without change of handedness i.e., reflecting incident left-circular polarized light as left-circular polarized light, to provide reflected light in the visible spectrum from violet to red.

The cellulose crystallites suitably bear charged groups, for example, sulfate groups or phosphate groups. The sulfate groups may be derived from the acid hydrolysis of the cellulosic materials, with sulfuric acid. Groups such as phosphate groups may be incorporated by a variety of well-known methods to the surface of the crystallites produced by acid hydrolysis. These charged groups may be totally or partially removed from the resulting cellulose crystallites, for example, to alter the colour of the resulting film. The preferred hydrolyzing acid is sulfuric acid which results in sulfate groups esterified onto the crystallites.

Aqueous liquid-crystalline suspensions of cellulose crystallites bearing sulfate groups are produced by sulfuric acid hydrolysis of natural cellulosic materials, for example, wood pulp, cotton, bast fibres and bacterial cellulose. The acid concentration must be less than that at which dissolution of the crystals takes place and thus should generally be less than about 72% w/w. The temperature must be high enough, usually from 30° to 60° C., and the time of hydrolysis long enough, usually 5 minutes to 2 hours, so that a stable colloidal dispersion of crystallites can be obtained. This will be the case when the cellulose crystallites are short enough and have a high enough degree of sulfate groups that have been esterified onto their surface. The optimal conditions can vary considerably, depending on the source of cellulose. It is important for a homogeneous hydrolysis and for a good yield of colour-forming fractions that the cellulosic material be milled prior to the hydrolysis, usually to pass a 20 to 100 mesh screen.

Typically, bleached Kraft pulp from black spruce is milled to pass a 100 mesh screen. Ten grams of this pulp, with a water content of about 7% is then added to 125 ml of 60% sulfuric acid kept heated at 60° C. The fluid mixture is stirred for 25 minutes and the hydrolysis is stopped by diluting about tenfold in water. The hydrolyzed material is then centrifuged and washed until the pH is $\geq 1$ and transferred to a dialysis bag. The removal of free acid is thus pursued until the dialysis water remains close to neutral. The material has then passed partly or wholly in suspension, forming a gel. This gel is treated in 10 ml aliquots with a Branson model 350 micro tip sonifier and the resulting liquid is further polished by a mixed-bed ion exchange resin treatment. The final product spontaneously self-assembles to form a chiral nematic liquid-crystalline phase in a certain concentration range, from about 1% to 20% w/w, preferably 2% to 10% w/w. At lower concentrations the suspension is isotropic and at higher concentrations it is a viscous gel which prevents the formation of the chiral nematic structure. The yield is about 60%.

The product is now in its acid form so that sulfur content can be measured by titration. The sulfur content is suitably about 0.4% to 1%, and is typically found to be of the order of 0.7%, by dry weight, of the solid, a measurement confirmed by elemental analysis. The salt forms of the liquid crystal can be obtained by neutralization with NaOH, KOH, etc. The ionic strength of the preparation can be adjusted by addition of electrolyte, but the suspension will precipitate or form a gel above a certain concentration (a salting-out effect), for example, at about 0.05M NaCl.

Transmission electron microscopy of the colloidal suspension reveals that it is composed of rod-like crystalline fragments ranging in length from about 25 nm to 500 nm, preferably about 100 nm to 200 nm, more preferably about 100 nm; and about 3 nm to 20 nm, preferably about 4 nm to 6 nm, more preferably about 5 nm wide. Electron diffraction shows that the crystallites have retained the native cellulose I structure found in the starting material.

If the colloidal suspension is allowed to dry, on a support surface, for instance in a petri dish at room temperature, it will form a solid in which the order of the liquid crystal has been preserved. This is revealed by microscopic analysis of the sample and by its optical properties, which are those of a liquid crystal. The preserved chiral nematic structure is found to be preferentially planar, i.e., with the long axis of the crystallites preferentially parallel to the substrate on which the film was dried. When the pitch of the dried film is of the order of visible light divided by the mean index of refraction of the cellulose (1.55), about 0.25 µm to 0.6 µm, it appears coloured and the colours change with the angle of viewing. The reflected light is left-circular polarized as expected from a left-handed helicoid. Different preparations will give different colours; longer hydrolysis time, finer mesh, and sources of cellulose with smaller crystal width, for example, wood rather than cotton, will tend to give helicoids with shorter pitches and hence reflecting shorter wavelengths.

The crystallite dimensions useful for preparing coloured films range, depending on the source, in width from 3 to 20 nm, preferably 5 nm and in length from 20 to 500 nm, preferably 100 nm.

The final reflection band of a solid film obtained from a given preparation can be tuned within a spectrum spanning the near infrared to the ultraviolet. This can be done in several ways. A first is to change the ionic strength by adding an electrolyte such as NaCl or KCl; this will shift the colour towards the blue. Another way of achieving the same result is to desulfate the preparation by heating it, (de-esterification occurs more easily for the acid form), and removing the freed acid before drying. A third approach to control the final pitch is to fractionate the preparation to obtain suspensions with shorter or longer average crystalline lengths.

This can be achieved by fractional precipitation or simply by phase separation, since longer crystallite rods will tend to form the liquid-crystalline phase at lower concentrations than the small fragments. Films dried from colloidal dispersions with crystallites of longer average lengths will be shifted towards the red, whereas those with shorter average lengths will be shifted towards the blue.

The planar orientation of the films can be almost perfect if the drying is done in a strong magnetic field, above 2 T, which is perpendicular to the drying surface. This, however, is not necessary, as all drying substrates, be they glass, polyethylene, polystyrene, paper, etc., yield a film with quasi-planar helicoidal texture. The adherence of the film on these substrates can be very poor, as for Teflon (Trade Mark for a polytetrafluoroethylene), or very good, as for paper and glass.

Of course, as for other translucent reflective interference devices, the colour of the underlying substrate affects the perceived colour of the film. A black (light-absorbing) background gives a saturated reflection colour, whereas a white background gives a variable mixture of the transmitted (complementary) colour and the reflected colour. The effects that can be achieved by underlying patterns or shapes of various colours are similar to those possible with thin-layer interference devices.

In addition to being optically variable, i.e., reflecting different colours for different viewing angles, the new materials reflect left-circular polarized light of the wavelength equal to their pitch multiplied by the mean refractive index of the material without changing its handedness. This makes them easily and cheaply distinguishable from all other optically variable materials which are not helicoidal and thus reflect circular-polarized light with its handedness reversed. These non-helicoid materials will appear dull or black when illuminated and viewed through a right-circular analyzer, composed of a polarizer and of a sheet of oriented birefringent material, e.g., polyethylene, of the proper thickness. The "solidified liquid crystals" will appear even more brightly coloured when viewed with the same simple apparatus.

Another exceptional feature of the films is that they can be made to swell again and redisperse in suspension, or be rendered stable and not reswellable, or be made to swell only partially while keeping the structure intact. This last possibility leads to another distinctive optical characteristic of the materials. A film which in the dry state appears blue may change to a green, yellow or red when in the wet state. This occurs because the pitch of the material is larger in the swollen state; when the material is allowed to dry again the original colour reappears. The transition is always to longer wavelengths when the pitch is enlarged, so that transitions from an invisible ultraviolet to blue, or from yellow to red, or from red to an invisible infrared are possible. These partially reswellable films can be obtained by heating the dried helicoids in order to remove the sulfate groups to a degree such that it allows the crystallites composing them to bond to each other strongly enough that they do not allow penetration of water between layers.

Yet another exceptional feature of the films is that they can be composite films with better strength, flexibility and other desirable qualities than the purely cellulosic films. Many materials, such as plasticizers, polymer resins, or reinforcing agents (woven or non-woven fibers of glass, carbon, wood, etc.) can be added to the dispersion without hindering the formation of the helicoidal structures. For instance, a plasticizer such as glycerol will make the films more pliable; a water soluble resin, such as a melamine resin will have the same effect, as well as a strengthening effect. Such a resin may or may not be cross-linked to the crystallites.

The invention also extends to man-made solidified liquid crystal films of rod-like particles of colloidal dimensions (not molecules) in a helicoidal (chiral nematic) arrangement exhibiting a chiral nematic pitch of about 0.1 µm to 1 µm; said films reflecting circular polarized light over a spectrum from ultraviolet to near-infrared. In the examples of the invention, cellulose crystallites are the rod-like particles. The invention is, however, not limited to cellulose crystallites solely. Any other rod-like particles of colloidal dimensions which are suspended in a liquid and which are colloidally stable (non-flocculating) will also self-assemble into ordered phases (liquid crystals) above a critical concentration. If a chiral interaction exists between the rods, be the said chiral interaction due to the rod geometry, to functional groups at the surface of the rods, to the liquid medium, or to the presence of any chiral agent in the liquid medium etc., the liquid crystal will adopt a chiral nematic arrangement. If the length and the width of the rods are appropriate, a solidified liquid crystal film comprising the rod-like particles arranged in a chiral nematic fashion and exhibiting a chiral nematic pitch of about 0.1 µm to 1 µm could be produced; such film will have the same optically variable properties as the films in the following Examples.

As long as a suspension of cellulose crystallites remains stable (non-flocculating) in water or another liquid vehicle, be the colloidal stability due to charged groups at the surface of the crystallites (such as sulfates, phosphates, nitrates, etc.), or to said chains attached to the crystallites, or to a stabilizing agent in the liquid vehicle, self-assemblies into liquid crystalline phases will be obtained above critical concentrations. If the chiral interaction between the rods is not hindered by the presence of the side chains or the stabilizing agent molecules, a chiral nematic arrangement will result in the liquid crystalline phases, and solidified liquid crystal film of cellulose with the same optically variable properties as those of the films given as Examples in the present invention will be obtained.

The films of the invention may be employed in articles, for example, the film may be supported on a substrate, especially a planar substrate such as paper, or may be embedded in a substrate, particularly to form a planar article; in the latter case the article may take the form of small discs of the film embedded in the substrate, for example, paper, such embedded discs are known in the security papers industry as planchettes. Data may be incorporated in the article, and for this purpose may, for example, be incorporated in or as a substrate, such as paper, on which the film is supported, or may be incorporated in a polymer sheet in which the film is embedded; the data may also be incorporated in an additive which is incorporated in the film, such addition having been incorporated in the dispersion from which the film is formed.

Figure 1:
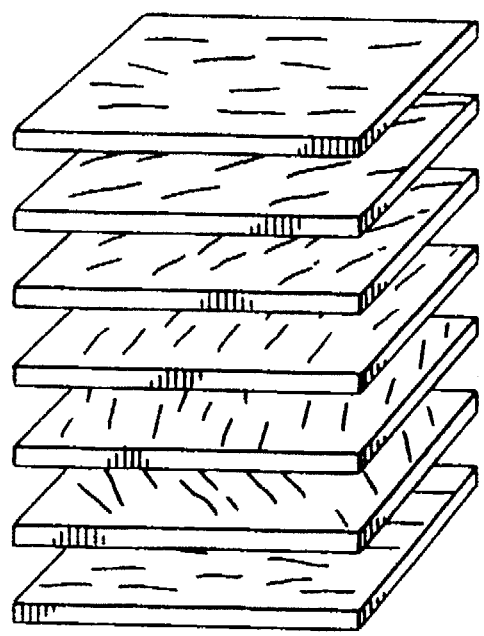
FIG. 1 illustrates schematically helicoidal orientation in typical chiral nematic liquid crystals.

DESCRIPTION OF PREFERRED
EMBODIMENTS WITH REFERENCE TO THE
DRAWINGS

With further reference to FIG. 1, the short lines represent a helicoidally oriented substance. In prior art chiral nematic liquid crystals the short lines represent molecules of the substance, or fragments of such molecules. In contrast, in the chiral nematic liquid crystals of the invention the short lines are not molecules or fragments of molecules, but are crystallites of colloidal dimensions.

The distance from top to bottom in the liquid crystal structure, schematically illustrated in FIG. 1, is P/2, where P is the pitch of the chiral nematic structure.

EXAMPLES

Example 1

Dissolving pulp from Rauma Repola, ref. 83120 (a commercial pulp sample), is milled in a Wiley mill to pass a 40 mesh screen. 8 g of this milled pulp is added to 60 ml of $H_2SO_4$ at 60% w/w. The mixture is hydrolyzed for 50 minutes in a 70° C. oven with stirring every 5 minutes. The reaction is stopped by diluting >10-fold with distilled water. The acid is removed, first by centrifuging and washing to pH≈1 and then by dialysis. The product, a gel, is then sonicated in ≈10 ml aliquots for 2 minutes with a Branson 350 Cell Disruptor. To the resulting liquid is added mixed-bed ion-exchange resin to remove all remaining free electrolyte. After the resin is removed, the mixture is a liquid suspension (4.09% w/w) of sulfated (0.73% S w/w of solid) cellulose microcrystals. This suspension phase-separates to give a cholesteric liquid crystal.

When the anisotropic phase is placed in a glass petri dish and allowed to dry overnight in a vertical 7T magnetic field, the result is a film which is almost transparent when viewed at a 90° angle, but which takes on a red to bronze colour when viewed at progressively smaller angles. Spectrophotometry reveals that the reflection at 90° is a very broad peak centered at 830 nm. The reflected light is left-circular polarized.

Example 2

Fully bleached Kraft pulp from 100% Black Spruce is milled to pass a 100 mesh screen. It is hydrolyzed in 60% $H_2SO_4$ at 60° C. for 20 minutes. It is then washed, dialyzed, sonicated and polished as in Example 1. It is then made into the salt form by adding NaOH to an alkaline pH and dialyzing against neutral water. The resulting product has a pH of about 4 and is thus a mixture of the salt and acid forms. The concentration of the suspension is 3.85% w/w, which is in the range in which phase separation occurs. The top, isotropic fraction is collected.

When dried on a Teflon surface in a vertical 7T magnetic field, this fractionated sample gives a solid film which appears deep red when viewed at 90° and yellow to green at sharper angles. When viewed with transmitted light it appears blue-green, which is the expected complementary colour. The reflection peak at 90° is a broad peak centered at 628 nm. The sample has the optical properties of liquid crystals.

Example 3

To 9.5 g of the suspension described in the previous Example is added 0.5 g of 0.001M NaCl. The mixture is then briefly sonicated and poured in a polystyrene petri dish which is placed in a vertical 7T magnetic field. The resulting dried film is very different from the one described above. When viewed at 90° it appears golden and at sharper angles it appears green and then blue. The complementary colours are seen in transmitted light viewing. The reflection peak is very broad and reaches a maximum at ≈580 nm.

Example 4

When the same sample described in Example 2 is allowed to dry on the top and bottom surfaces of the disk of black paper, the result is a vividly coloured paper which is blue on top and golden on the bottom. The intensity of the colours is due to the fact that the background is black. The difference in colouration of the two sides is due to further fractionation which occurred during drying. When placed in water the colours of the film shift towards the red and then disappear. The film can then be redispersed by mechanical treatment or by ultrasounds.

Parts of this film-coated paper were placed in an 80° C. oven for 16 hours. This did not change the aspect of the film but affected its swelling properties. When wet, the colour on top changes from blue to gold and that on the bottom changes from gold to red, but the shift goes no further, even when left in water for a prolonged time. The film regains its original colours when dried.

Example 5

A new preparation of liquid crystals was made under the same conditions as described in Example 2, but this time the suspension is not fractionated. The preparation was then slowly desulfated to varying degrees by heating at 70° C. The sulfur content was then measured by titration and ≈3 ml of each of four preparations were allowed to dry on glass slides. The results were as follows:

| Sulfur Content (% w/w solid) | Colour of dried film |
| --- | --- |
| 0.89 | None (IR) to red (angled) |
| 0.74 | Red to gold |
| 0.69 | Orange to green |
| 0.61 | Gold to blue |

Example 6

A new preparation was made, again under the same conditions as in Example 2, but the preparation was not fractionated. To four aliquots of the resulting suspension in its acid form, each containing 0.1 g of cellulose crystallites, are added 0.2 ml of a 0.01M NaCl solution. The first of these is allowed to dry in a polystyrene petri dish and yields a brittle film with a peak absorbance at 640 nm. To the other three aliquots are added 0.1, 0.2 and 0.4 ml of a 2.5% w/V solution of glycerol and they are then also dried in petri dishes. They yield films with peak absorbances at 710, 730 and 840 nm respectively, which are much more supple than the film without glycerol.

Glycerol does not prevent the formation of the helicoidal structure and acts as a plasticizer while increasing slightly the peak absorbance wavelength. Addition of more salt can compensate this effect. Thus a film prepared with 0.1 g of cellulose, 0.3 ml of 0.01M NaCl and 0.5 ml of 2.5% w/V glycerol has a peak absorbance of 670 nm. This is close to the 640 nm of the original film without glycerol, yet this new film is much less brittle.

Example 7

To each of three aliquots of the suspension described in Example 6, each containing 0.1 g of cellulose, are added 0.4 ml of 0.01 m NaCl. A solution of 3.5% Nanoplast (a registered Trade Mark for a water-soluble melamine resin used for embedding samples for microscopy) is then added to the samples; 0.1 ml to the first, 0.2 ml to the second and 0.3 ml to the third. They are then dried in petri dishes. The films obtained are, as for glycerol in Example 6, more supple than films to which no resin is added. A shift in peak absorbances occurs, but this time it brings them into the ultraviolet region, rather than towards the infrared as it did for glycerol. This can be compensated for by diminishing the amount of salt added. The melamine monomers seem to have polymerized, probably due to the catalytic effect of the acid groups present on the crystallite surface. This is indicated by the fact that swelling of the composite films in water is much more limited than for films without polymer.

Thus a composite film comprising a melamine resin and cellulose crystallites can be made without hindering the formation of the helicoidal structure.

We claim:

1. A solidified liquid crystal cellulose film comprising crystal particles of colloidal dimensions, of native cellulose I, in a helicoidal arrangement exhibiting a chiral nematic pitch of about 0.1 μm to 1 μm; said film reflecting left-circular polarized light over a spectrum from ultraviolet to near-infrared.

2. A film according to claim 1, wherein said chiral nematic pitch is about 0.25 μm to 0.6 μm, said film having a coloured iridescent appearance and reflecting incident left-circular polarized light as left-circular polarized light to provide reflected light in the visible spectrum from violet to red.

3. A film according to claim 1, wherein said helicoidal arrangement has chiral nematic axes perpendicular to a surface of the film.

4. A film according to claim 3, wherein said crystal particles have their long axes parallel to said surface of the film.

5. A film according to claim 1, which displays the following characteristics:

a) reflection of light by constructive interference with the reflected wavelengths of light changing with viewing angle in accordance with Bragg's Law;

b) left-circular polarization of reflected light and reflection of incident left-circular polarized light as left-circular polarized light; and c) optical activity resulting in rotation of transmitted plane-polarized light.

6. A film according to claim 1, wherein said crystal particles have a particle size of about 3 nm to 20 nm wide by about 25 nm to 500 nm long and have charged groups on their surface.

7. A film according to claim 6, wherein said particle size is about 5 nm wide by 100 nm long.

8. A film according to claim 6, in which said charged groups are sulfate groups or phosphate groups.

9. A film according to claim 6, in which said charged groups are sulfate groups.

10. A film according to claim 9, wherein said sulfate groups are esterified onto the surface of the crystal particles to a degree such that the sulfur content is from about 0.4% to 1% of the dry weight, and such that a 1 to 20% w/w concentration of said crystal particles in water forms a stable colloidal dispersion.

11. A film according to claim 6, wherein said charged groups have been totally or partially removed from said crystal particles.

12. A solidified liquid crystal cellulose film of crystal particles of colloidal dimensions, of native cellulose I, in helicoidal arrangements exhibiting a chiral nematic pitch of about 0.25 μm to 0.6 μm, said film having a coloured iridescent appearance and reflecting left-circular polarized light to provide reflected light in the visible spectrum from violet to red;

said helicoidal arrangements having their chiral nematic axes perpendicular to a surface of the film and said cellulose crystals having their long axes mostly parallel to said surface;

said film displaying the following characteristics:
- a) reflection of light by constructive interference with the reflected wavelengths of light changing with viewing angle in accordance with Bragg's Law;
- b) left-circular polarization of reflected light and reflection of incident left-circular polarized light as left-circular polarized light; and
- c) optical activity resulting in rotation of transmitted plane-polarized light.

13. A film according to claim 1, further including at least one additive which does not hinder formation of said liquid crystalline phase, said additive being selected from plasticizers, reinforcing agents or polymer resins.

14. A film according to claim 13, in which said at least one additive comprises glycerol as a plasticizer.

15. A film according to claim 13, in which said at least one additive comprises a reinforcing agent selected from glass, carbon, polymer fibers, wood fibers, woven fabric or non-woven fabric.

16. A film according to claim 13, in which said at least one additive is a polymer resin.

17. A film according to claim 16, in which said polymer resin is a melamine resin which forms a polymer matrix surrounding the crystal particles.

18. A film according to claim 17, in which said polymer matrix is cross-linked to said crystal particles.

19. A film according to claim 13, having a data carrying substrate incorporated in said film.

20. A film according to claim 1, which swells when wetted, having a variable pitch and reflecting variable colours.

21. An article comprising a film as defined in claim 1, supported on a substrate.

22. An article comprising a film as defined in claim 1, embedded in a substrate.

23. An article according to claim 21, wherein said substrate is paper.

24. An article according to claim 21, wherein said substrate has data incorporated therein.

25. A process for producing a solidified liquid crystal cellulose film comprising:

hydrolyzing a particulate natural cellulosic material with acid, recovering a stable colloidal dispersion of crystal particles of native cellulose I in a concentration from about 1% to 20% w/w, allowing said crystal particles to form a chiral nematic liquid crystalline phase in said dispersion, casting said dispersion as a wet film on a planar support, and drying said wet film to provide said solidified liquid crystal cellulose film on said support, said film exhibiting a chiral nematic pitch of 0.1 µm to 1 µm.

26. A process according to claim 25, wherein said particulate, natural cellulosic material has a particle size to pass a 20 to 100 mesh screen.

27. A process according to claim 25, wherein said dispersion further includes at least one additive which does not hinder formation of said liquid crystalline phase, said additive being selected from plasticizers, reinforcing agents or polymer resins.

28. A process according to claim 25, wherein said drying is carried out in or after exposure in a strong magnetic field of more than 2T perpendicular to the planar support surface of said support.

29. A process according to claim 25, including a step of adjusting the ionic strength of said dispersion to alter the colour of said film.

30. A process according to claim 25, including a step of adjusting the sulfur content to alter the colour of said film.

31. A process according to claim 25, including a step of fractionating said dispersion to yield a fraction producing said film in a predetermined colour.

32. A solidified liquid crystal film comprising elongate cellulosic crystal particles of colloidal dimensions in a helicoidal arrangement exhibiting a chiral nematic pitch of about 0.1 µm to 1 µm; said film reflecting left-circular or right-circular polarized light over a spectrum from ultraviolet to near-infrared.

33. A film according to claim 32, wherein said particles are rods.

34. A film according to claim 33, wherein said film reflects left-circular polarized light over a spectrum from ultraviolet to near-infrared.

35. A film according to claim 33, wherein said film reflects right-circular polarized light over a spectrum from ultraviolet to near-infrared.

* * * * *